(12) United States Patent
Palanigounder et al.

(10) Patent No.: US 11,889,306 B2
(45) Date of Patent: *Jan. 30, 2024

(54) METHOD FOR DERIVING A NETWORK SPECIFIC IDENTIFIER (NSI)

(71) Applicant: QUALCOMM Incorporated, San Diego, CA (US)

(72) Inventors: Anand Palanigounder, San Diego, CA (US); Lenaig Genevieve Chaponniere, La Jolla, CA (US); Sebastian Speicher, Wallisellen (CH); Haris Zisimopoulos, London (GB); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/929,993

(22) Filed: Sep. 6, 2022

(65) Prior Publication Data

US 2023/0075886 A1    Mar. 9, 2023

Related U.S. Application Data

(63) Continuation of application No. 17/014,830, filed on Sep. 8, 2020, now Pat. No. 11,470,474.

(Continued)

(51) Int. Cl.
*H04W 12/06*    (2021.01)
*H04W 8/26*    (2009.01)

(52) U.S. Cl.
CPC .............. *H04W 12/06* (2013.01); *H04W 8/26* (2013.01)

(58) Field of Classification Search
CPC ................................ H04W 12/06; H04W 8/26
(Continued)

(56) References Cited

U.S. PATENT DOCUMENTS

2003/0119481 A1   6/2003   Haverinen et al.
2007/0191006 A1   8/2007   Carpenter
(Continued)

FOREIGN PATENT DOCUMENTS

CN    109257793 A    1/2019
WO    2019020439     1/2019

OTHER PUBLICATIONS

"3 Generation Partnership Project; Technical Specification Group Services and System Aspects, Security architecture and procedures for 5G system (Release 16)", 3GPP Standard; Technical Specification; 3GPP TS 33.501, 3rd Generation Partnership Project (3GPP), Mobile Competence Centre; 650, Route Des Lucioles; F-06921, Sophia-Antipolis Cedex; France, vol. SA WG3, No. V16.0.0, Sep. 25, 2019 (Sep. 25, 2019), pp. 1-196, XP051784886.

(Continued)

*Primary Examiner* — Mark G. Pannell
(74) *Attorney, Agent, or Firm* — Patterson & Sheridan, L.L.P.

(57) ABSTRACT

Certain aspects provide a method for wireless communication. The method generally includes deriving a network specific identifier (NSI) in a network access identifier (NAI) format, the NSI including a network identifier (NID) stored at the UE, generating a subscription concealed identifier (SUCI) based on the NSI for authentication of the UE with a non-public network (NPN), and sending the SUCI to a network entity for the authentication of the UE with the NPN.

25 Claims, 7 Drawing Sheets

Related U.S. Application Data

(60) Provisional application No. 62/907,494, filed on Sep. 27, 2019.

(58) Field of Classification Search
USPC .......................................................... 455/411
See application file for complete search history.

(56) References Cited

U.S. PATENT DOCUMENTS

| | | |
|---|---|---|
| 2016/0183169 A1 | 6/2016 | Horn et al. |
| 2018/0332457 A1 | 11/2018 | Thiebaut et al. |
| 2020/0275279 A1 | 8/2020 | Tangudu et al. |
| 2020/0396673 A1 | 12/2020 | Tiwari et al. |
| 2020/0396788 A1 | 12/2020 | Tiwari et al. |
| 2021/0099869 A1 | 4/2021 | Palanigounder et al. |
| 2021/0281995 A1 | 9/2021 | Kumar et al. |

OTHER PUBLICATIONS

"3rd Generation Partnership Project; Technical Specification Group Services and System Aspects; System Architecture for the 5G System (5GS); Stage 2 (Release 16)", 3GPP Standard; Technical Specification; 3GPP TS 23.501, 3rd Generation Partnership Project (3GPP), Mobile Competence Centre, 650, Route Des Lucioles, F-06921, Sophia-Antipolis Cedex, France, vol. SA WG2, No. V16.2.0, Sep. 24, 2019 (Sep. 24, 2019), pp. 1-389, XP051784669.
International Search Report and Written Opinion—PCT/US2020/049946—ISA/EPO—Nov. 27, 2020.
OPPO: "Introducing Support for Non-Public Networks and Operations on Allowed CAG List", 3GPP TSG-SA WG2 Meeting #131, S2-1901613, Tenerife (Spain), Feb. 25-Mar. 1, 2019, 10 pages.

METHOD FOR DERIVING A NETWORK SPECIFIC IDENTIFIER (NSI)

CROSS-REFERENCE TO RELATED APPLICATION

This application is a continuation of U.S. application Ser. No. 17/014,830, filed Sep. 8, 2020, which claims benefit of and priority to U.S. Provisional Application No. 62/907,494, filed Sep. 27, 2019, which are hereby assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for network authentication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly.

Certain aspects provide a method for wireless communication. The method generally includes deriving a network specific identifier (NSI) in a network access identifier (NAI) format, the NSI including a network identifier (NID) stored at the UE, generating a subscription concealed identifier (SUCI) based on the NSI for authentication of the UE with a non-public network (NPN), and sending the SUCI to a network entity for the authentication of the UE with the NPN.

Certain aspects provide an apparatus for wireless communication by a UE, comprising a memory, and one or more processors coupled to the memory, the memory and the one or more processors being configured to derive a NSI in a NAI format, the NSI including a NID stored at the UE, generate a SUCI based on the NSI for authentication of the UE with a NPN, and send the SUCI to a network entity for the authentication of the UE with the NPN.

Certain aspects provide an apparatus for wireless communication by a UE, comprising means for deriving a NSI in a NAI format, the NSI including a NID stored at the UE, means for generating a SUCI based on the NSI for authentication of the UE with a NPN, and means for sending the SUCI to a network entity for the authentication of the UE with the NPN.

Certain aspects provide a computer-readable medium having instructions stored thereon to cause a UE to derive a NSI in a NAI format, the NSI including a NID stored at the UE, generate a SUCI based on the NSI for authentication of the UE with a NPN, and send the SUCI to a network entity for the authentication of the UE with the NPN.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for generating a subscription identifier to authenticate a user-equipment (UE) with a non-public network.

The following description provides examples of communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
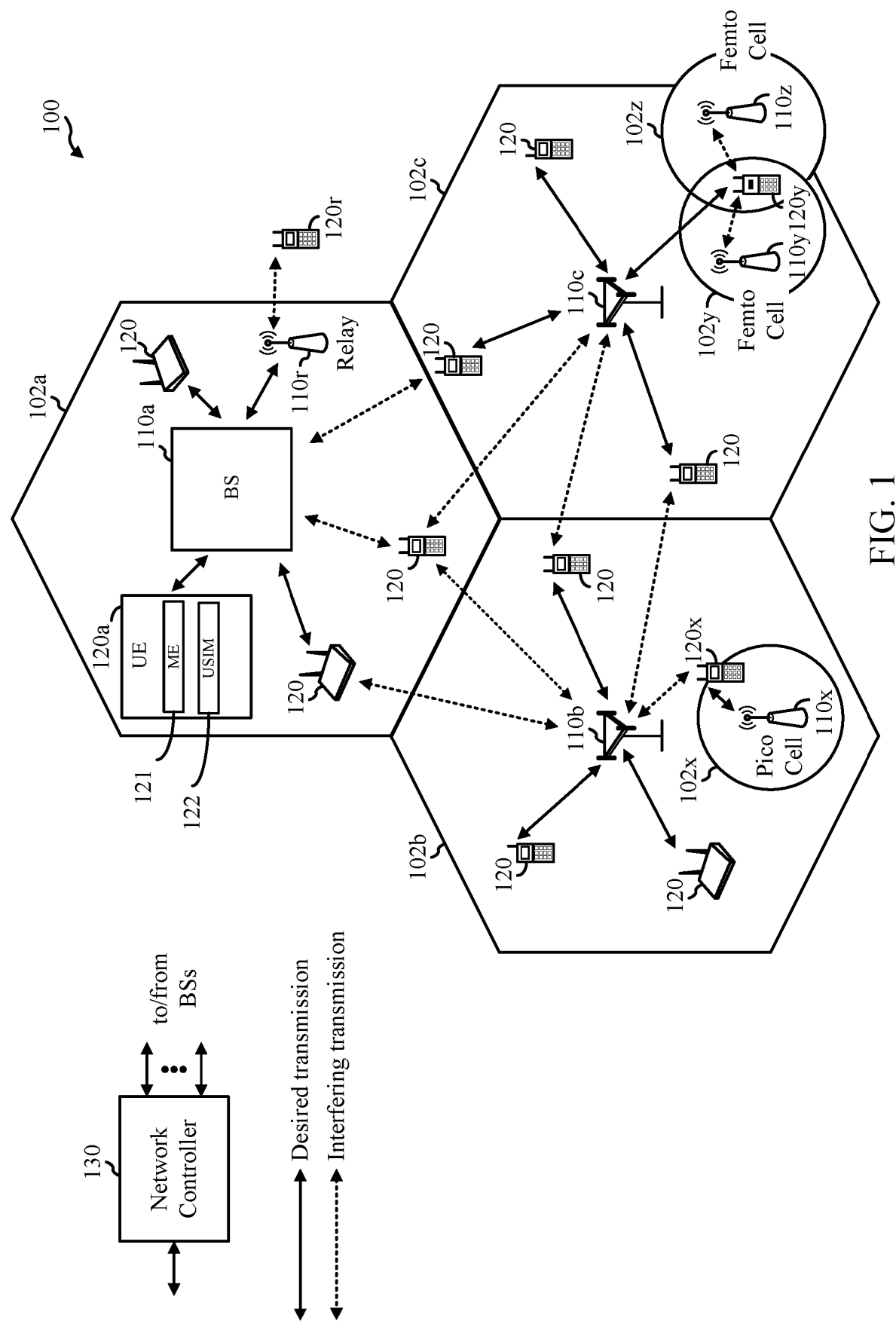
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul. As illustrated, the UE includes mobile equipment (ME) 121 and a universal subscriber identity module (USIM) 122.

Figure 2:
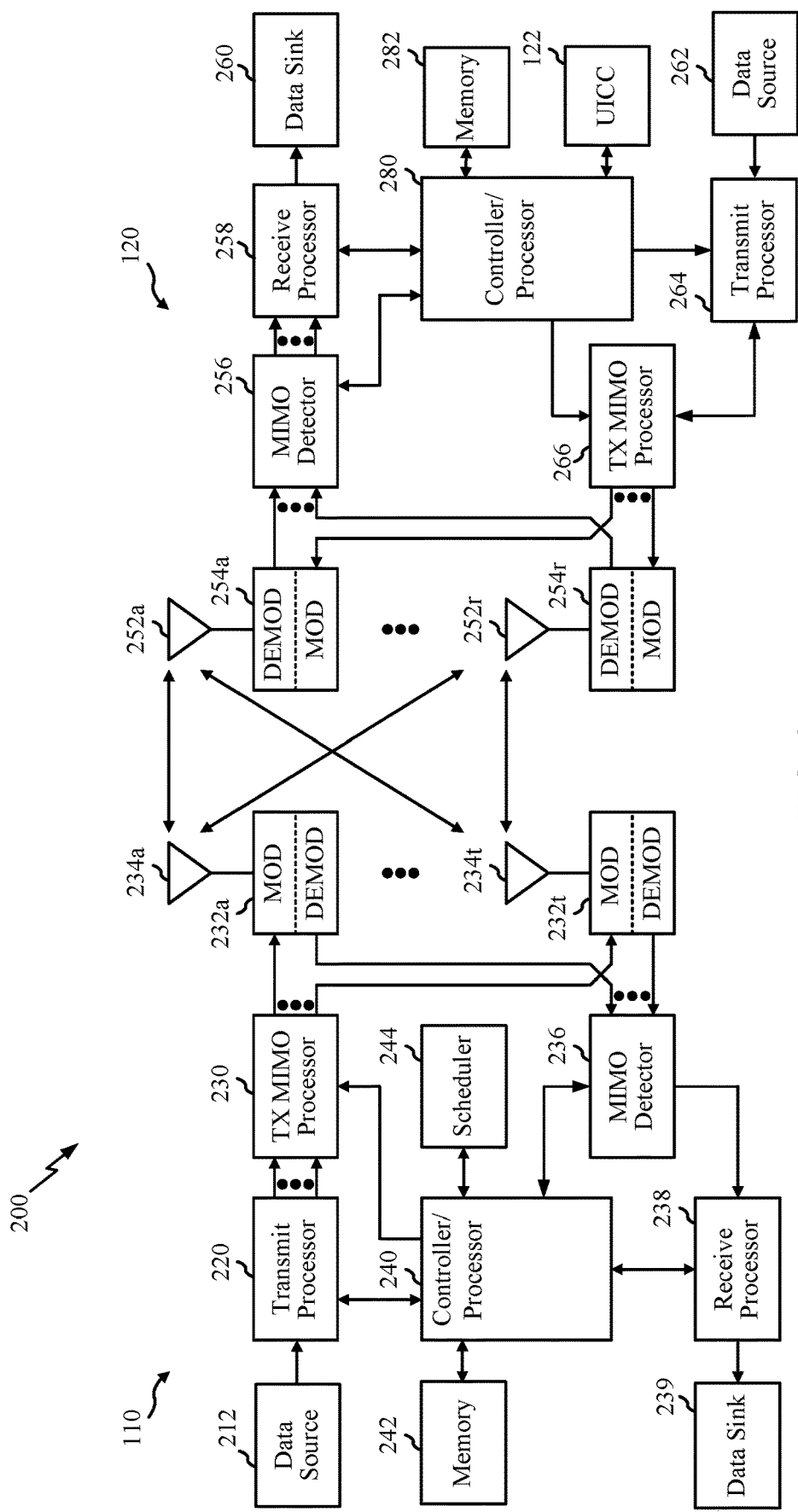
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink. A universal subscriber identity module (USIM) application may be used for credential storage and processing on the UE. The USIM may reside on a removable or non-removable universal integrated circuit board (UICC) 122, as illustrated.

Example Techniques for Deriving a
Network-Specific Identifier (NSI)

Non-public networks (NPNs) are intended for the sole use of a private entity such as an enterprise, and may be deployed in a variety of configurations, utilizing both virtual and physical elements. Specifically, NPNs may be deployed as completely standalone networks, may be hosted by a Public Land Mobile Network (PLMN), or may be offered as a slice of a PLMN.

Figure 3A:
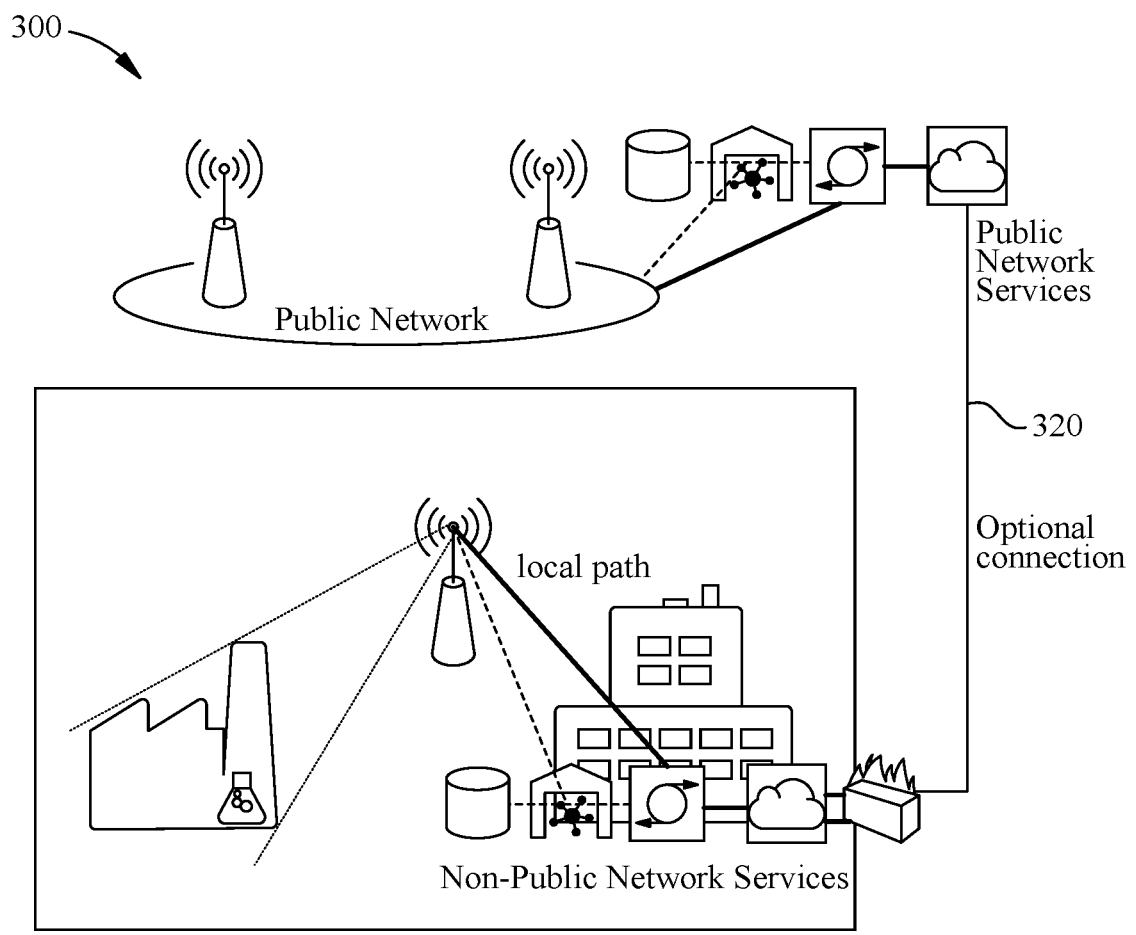
FIGS. 3A and 3B illustrate a standalone non-public network (NPN) deployment and various Public Land Mobile Network (PLMN)-integrated NPN deployments.
Figure 3B:
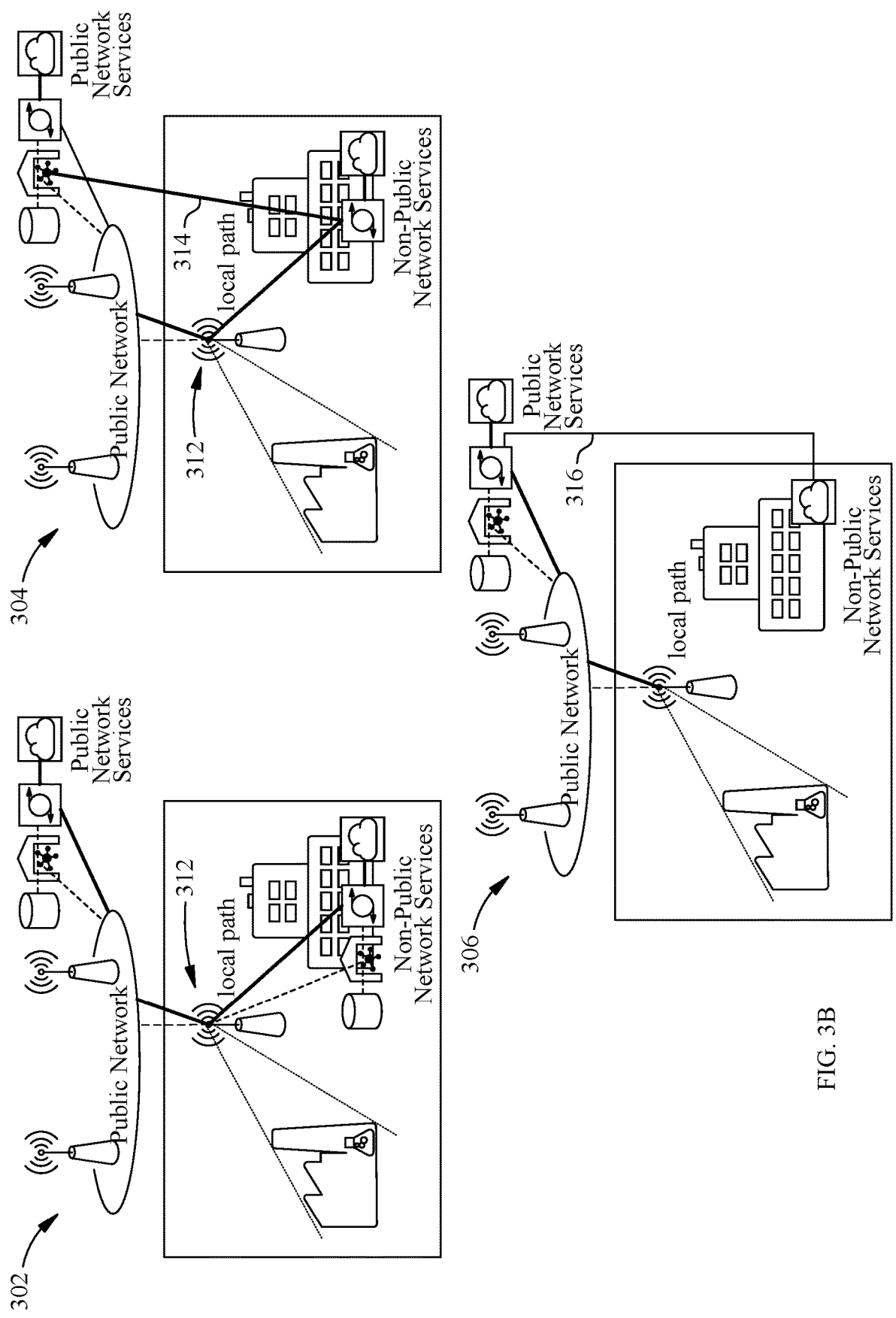

FIGS. 3A and 3B illustrate a standalone NPN (SNPN) deployment 300 and various PLMN-integrated NPN deployments 302, 304, 306. For a SNPN deployment, the SNPN may be deployed by the NPN operator without any relation to the PLMN operator. However, optionally, an interface 320 may be used for access to PLMN services, even for a SNPN, as illustrated. PLMN-integrated NPN deployments may be deployed with the help of the PLMN. In this case, the authentication and subscription may be managed by the PLMN. Thus, the USIM application of the SIM card may be used both to connect, register, and access services of the NPN as well as the PLMN network. As illustrated, the PLMN-integrated NPN deployment 302 involves a deployment with a shared RAN 312, the PLMN-integrated NPN deployment 304 involves a deployment with a shared RAN 312 and control plane 314, and the PLMN-integrated NPN deployment 306 involves a NPN deployment in a public network via interface 316.

With regards to SNPN, each SNPN may have its own subscription and may decide which type of authentication method to use. For example, an SNPN operator may configure device to use a SNPN authentication method, other than authentication and key agreement (AKA) protocol (e.g., 5G AKA or Extensible Authentication Protocol (EAP)-AKA'). Support of EAP in 5GS allows the SNPN to use different credentials/authentication methods (e.g., for industrial internet of things (IoT)) without impacting other intermediate 5GS network functions, which may allow the SNPN to plug-in their existing Identity Management (IdM) system, and may only impact the UE and the network authentication infrastructure (e.g., authentication server function (AUSF)/ user data management (UDM)). Each SNPN may have its own credentials/authentication method, and the selection of which authentication method is to be used may be left to the SNPN operator. For example, if AKA based method is selected, then a universal subscriber identity module (USIM) application may be used for credential storage and processing on the UE. The USIM may reside on a removable or non-removable universal integrated circuit board (UICC) (e.g., embedded UICC (eUICC) or integrated UICC (iUICC)). A UE may include a UICC and mobile equipment (ME), as illustrated in UE 120a of FIG. 1.

If a non-AKA method is selected, the non-AKA authentication method may be a key generating EAP method. For example, EAP-transport layer security (TLS) may be used, which may involve client and server certificates. Moreover, the UE may be pre-configured with a UE client certificate and the network certificate authority (CA) certificate. The network may be configured with the UE's CA certificate.

For the non-AKA method, the SNPN operator may decide where credentials are to be stored and processed in the UE. However, it is expected that the credentials will to be stored mainly in the ME. If AKA method is selected, then the UICC may be used for storage and processing of credentials. In some cases, the same USIM may be shared among multiple SNPNs or different USIMs may be used by different SNPN(s). In case of more than one USIM, each USIM may reside on a different UICC (e.g. for a dual SIM or multi-SIM UE).

Each SNPN may be identified by its SNPN identity. The SNPN identity may be consisting of the public land mobile network (PLMN) ID and the network ID (NID). A SNPN identity may or may not be globally unique. Moreover, a UE that supports SNPN access mode may be provisioned with a list of subscriber data stored in the ME. Each entry in the list may include an SNPN identity (e.g., identifier of the SNPN operator), a subscription identifier (e.g., SUPI) containing either the IMSI or a network-specific identifier (NSI) in network access identifier (NAI) format (e.g., username@realm format), credentials to be used for the SNPN (e.g., in case AKA based method is not used), and unified access control (UAC) configuration of the UE for the SNPN (e.g., access class identities of the SNPN). If AKA method is to be used for a given SNPN, credentials may be stored and processed by USIM, as described herein.

In certain aspects, a Subscription Permanent Identifier (SUPI) may be derived for NPN authentication. Generally, SUPI may be either an International Mobile Subscriber Identity (IMSI) or NSI. NSI may be used as the SUPI for accessing NPNs. NSI may be in NAI format (e.g., username@realm), as described herein.

Subscription Concealed Identifier (SUCI) is a protected version (e.g., encrypted version) of SUPI that may be sent over the air. SUCI is implemented for SUPI privacy, generated using an encryption method that allows the subscription identifier to be transmitted over the air. The SUCI includes an encryption of a mobile subscription identification number (MSIN) (e.g., private information) of the SUPI. The home network identifier part of the SUPI (e.g., mobile country code (MCC)/mobile network code (MNC) when using IMSI, or SNPN Identity when using NSI) may be included in the clear in SUCI and only the MSIN or username part (e.g., in case of NSI) of SUPI may be encrypted. The home network identifier is used for the serving network to identify and route messages to the home network. In 5G, SUPI may not be sent by the UE over the air, but only SUCI may be sent over the air for privacy. SUCI calculation may be performed by the ME or the USIM, depending on the configuration of the USIM, in accordance with certain aspects of the present disclosure.

In case AKA based method is used for SNPN access, it may be unclear how to derive the NSI. When AKA based method is used, USIM may be used for authentication and the IMSI may be stored in a file, namely, the $EF_{IMSI}$ file. For AKA, secret long-term key(s) and authentication algorithms reside on the USIM. Since the SUPI is an NSI for SNPN access, the NSI may be derived from the IMSI stored in the USIM and the SNPN identity stored in the ME, as described in more detail herein. Moreover, SUCI may be derived for signaling to the network.

Certain aspects of the present disclosure are directed to a UE determining when the ME is to use the subscription credentials stored in the USIM versus subscription credentials stored in the ME. For example, the ME may determine whether there is a USIM available with an IMSI that matches SUPI of a selected SNPN or an IMSI where the PLMN ID (MCC/MNC) part of the IMSI match the PLMN ID part of the SNPN identity stored in the ME. If so, the UE may use the subscription credentials stored in the USIM for deriving NSI. Certain aspects of the present disclosure are directed to techniques for deriving NSI from IMSI by the ME, as described in more detail herein.

Figure 4:
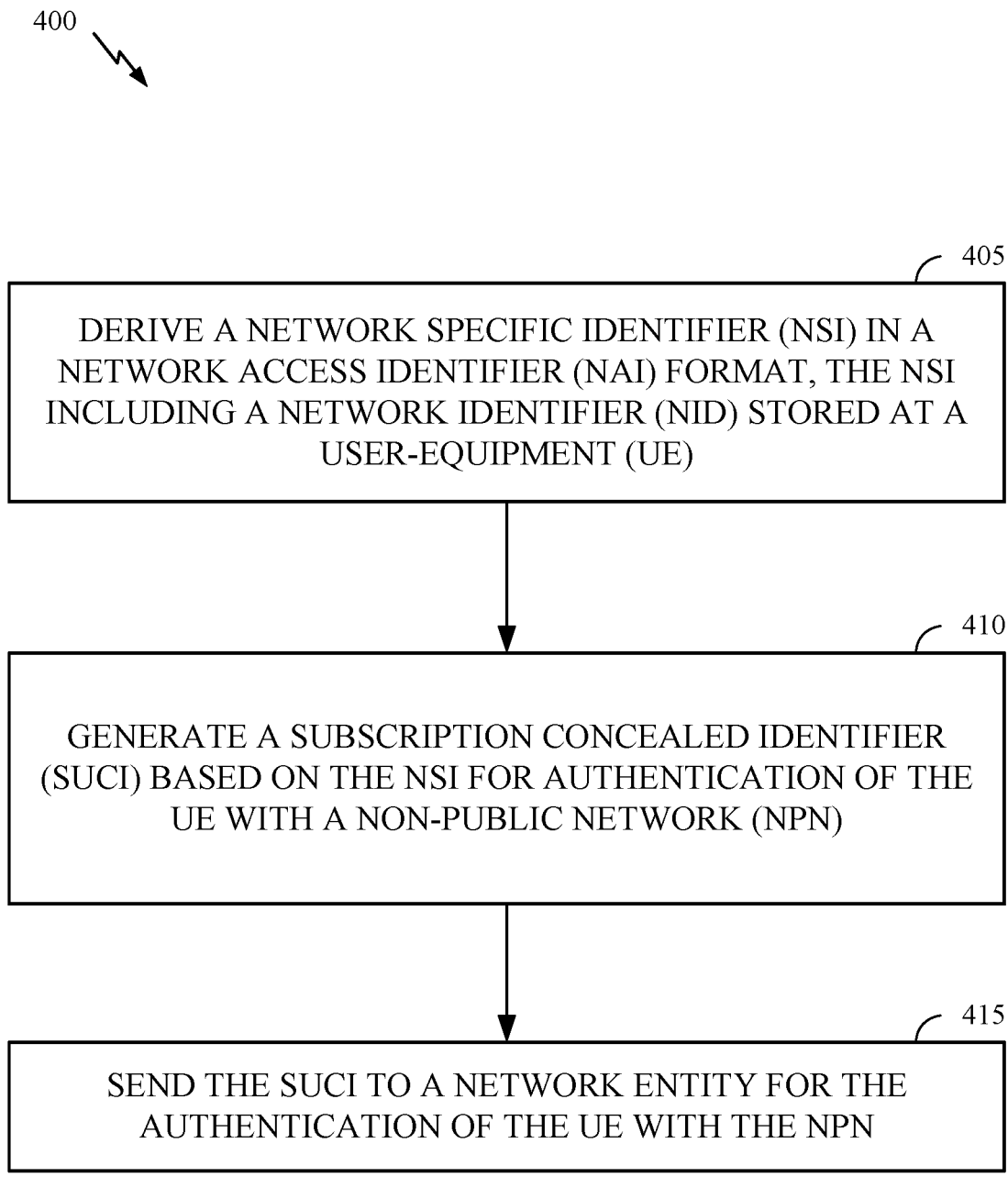
FIG. 4 is a flow diagram illustrating example operations for wireless communication, in accordance with certain aspects of the present disclosure.

FIG. 4 is a flow diagram illustrating example operations 400 for wireless communication, in accordance with certain aspects of the present disclosure. The operations 400 may be performed, for example, by UE (e.g., such as a UE 120a in the wireless communication network 100).

Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at block 405, by deriving a NSI in a NAI format, the NSI including a NID stored at the UE (e.g., stored at a ME of the UE). For example, the NAI format may include a username portion and a realm portion. The realm portion may include the NID. In certain aspects, the realm portion may also include a PLMN identifier. For example, the PLMN identifier and the NID may be parts of a NPN identifier (e.g., SNPN identifier) stored at a ME of the UE. In certain aspects, the username portion may include a MSIN of the UE.

In certain aspects, the ME may determine whether to select a USIM of the UE for accessing the NPN using a subscriber data list. For example, the operations 400 may also include determining whether a USIM of the UE includes an IMSI that matches a SUPI of the NPN, or the IMSI includes a PLMN ID that matches a PLMN ID of an identifier of the NPN stored at the UE. If so, the NSI may be derived, at block 405, using the IMSI of the USIM of the UE.

In certain aspects, the operations 400 may also include, at block 410, generating a SUCI based on the NSI for authentication of the UE with a NPN. For example, the SUCI may be generated by encrypting the MSIN, the username portion of the NSI being the encrypted MSIN. The encryption of the MSIN may be performed in accordance with the configuration of the UE. For example, if a USIM of the UE is configured to perform SUCI calculations, the encryption of the MSIN may be performed by the USIM of the UE, and if a ME of the UE is configured to perform the SUCI calculations, the encryption of the MSIN may be performed by the ME of the UE. At block 415, the UE may send (e.g., transmit) the SUCI to a network entity for the authentication of the UE with the NPN.

As described herein, for each SNPN, the ME may be configured with a list of subscription data, including at least the SUPI, SNPN identity, and credentials (e.g., if AKA based method is not used). Using the list of subscription data and other information available to the ME, the ME may perform network selection procedure to select an SNPN from the one or more of the available networks. The other information available to the ME may include, for example, networks available at a given location of the UE, priority for network selection that may be either configured on the UE or with input from the user, services offered by the network. For the selected SNPN (identified by its SPN Identity), the ME may check whether there is a USIM available with an IMSI that matches SUPI of the selected SNPN or an IMSI where the PLMN ID (MCC/MNC) part of the IMSI match the PLMN ID part of the SNPN identity stored in the ME. If so, the ME reads the IMSI from the USIM and derives the NSI using the IMSI retrieved from the USIM and the SNPN Identity.

In an alternative aspect, the ME may decide to use the IMSI configured as the subscriber identifier in the subscription data once the ME determines that matching USIM is present on the UE for deriving the NSI instead of the IMSI stored on the USIM. The NSI may be derived such that the username part of the NAI includes the MSIN of the IMSI and the realm part of the NAI includes the SNPN identity. For example, the NSI may be set to the format username@realm, which may then be used as the SUPI by the ME for further procedures (e.g., for registration with the network).

As an example, if IMSI is 234150999999999, MCC is 234, MNC is 15 and MSIN is 0999999999. The SPN identity is PLMN ID (23415) plus NID (e.g., 123456789A), then the username which is 0999999999. The realm may be equal to snpn.nid123456789A.mnc015.mcc234.3gppnetwork.org. Thus, the NSI may be equal to 0999999999@snpn.nid123456789A.mnc015.mcc234.3gppnetwork.org. In certain aspects, the derived NSI may be treated as a root NAI and the NAI may optionally be further enhanced upon (e.g., both username part and the realm part of the NSI) with other information before using it as the NSI.

Certain aspects of the present disclosure are directed to the SUCI calculation. For example, when a USIM is used for accessing the selected SNPN, the SUCI (for SUPI Privacy) may be calculated either by the ME or the USIM for SUPI privacy and may be determined by the configuration in the USIM. In other words, if USIM is configured to perform SUCI calculation (e.g., both Service no 124 and service no 125 are available on the USIM) for the SNPN, then the ME may use the USIM to encrypt the MSIN (e.g., by invoking GET IDENTITY command to the USIM). If ME is configured to perform SUCI calculation (Service no 124 available on the USIM but no Service no 125) then the ME may perform the encryption of the MSIN. If service no 124 is not available on the USIM, then the ME may use a null encryption.

Once the MSIN is encrypted, then the SUCI is formatted in NAI format with the realm part of the SUCI set to the realm of the NSI (e.g., derived by the ME from the IMSI and the SNPN identity) and the username including at least the encrypted MSIN for the selected SNPN. In certain aspects, the ME may use the SUCI in NAI format as the SUCI when registering to SNPN.

While certain aspects have described a derivation method for NSI to be used for SNPN, the derived NSI may also be used for registering to PLMN-integrated NPNs. For example, when accessing PLMN integrated NPN networks, the USIM issued by the PLMN may be used (e.g., AKA based authentication is used for NPN access). In such cases, the NSI derivation techniques proposed herein may be used for registering to the PLMN-integrated NPN networks.

Figure 5:
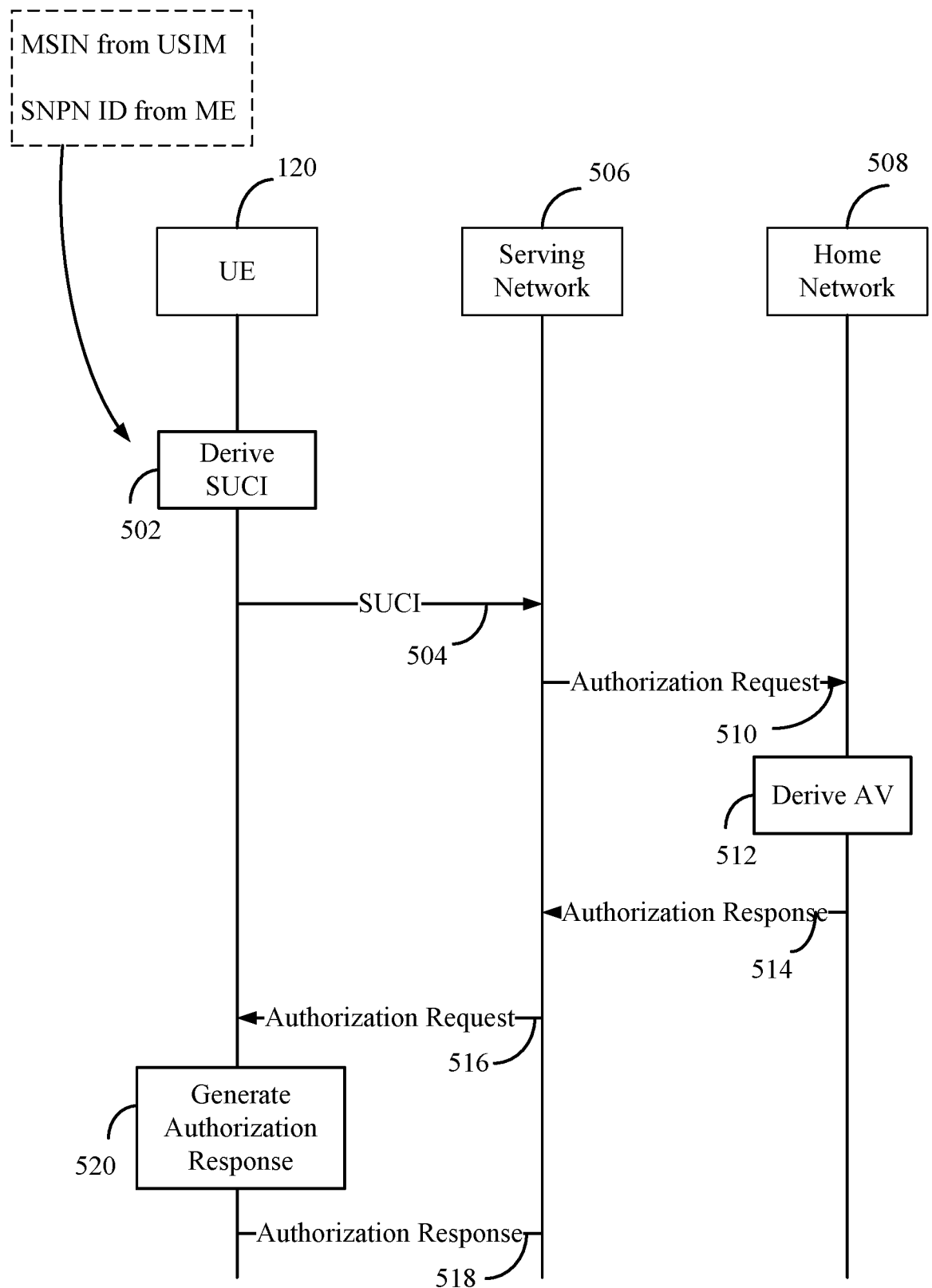
FIG. 5 illustrates an example authentication protocol, in accordance with certain aspects of the present disclosure.

FIG. 5 illustrates an example authentication protocol (e.g., AKA protocol), in accordance with certain aspects of the present disclosure. As illustrated, at block 502, the UE 120 may derive a SUCI 504 (e.g., by encrypting a SUPI) in accordance with the techniques described herein. For example, as described herein, the ME of the UE may read the IMSI from the USIM and derive the NSI using the IMSI retrieved from the USIM and the SNPN identity. The SNPN identity may be derived such that the username part of the NAI includes the MSIN of the IMSI and the realm part of the NAI includes the SNPN identity.

When registering to a network, the UE (e.g., a USIM of the UE) may send a registration request with the SUCI 504 to a serving network 506. The serving network 506 may then send, to a home network 508, an authorization request 510. The home network may use keys stored at the home network for decryption of the SUCI to obtain the SUPI. In a non-roaming scenario, the serving network and the home network may be the same network. Knowing the SUPI, the home network 508 may generate an authentication vector (AV), at block 512, which may include keys derived by running an authentication algorithm, an authentication token, a random number to be used as a challenge for the UE 120, and the expected response from the UE 120. The AV is forwarded to the serving network 506 in an authorization response 514. The serving network 506 then sends the random number and the authentication token of the AV to the UE in an authorization request 516. The UE then generates, at block 520, an authorization response 518 for the given random number which is sent to the serving network 506 for authentication. The serving network will then verify that the authentication response matches the expected response and if so, the authentication is successful.

Figure 6:
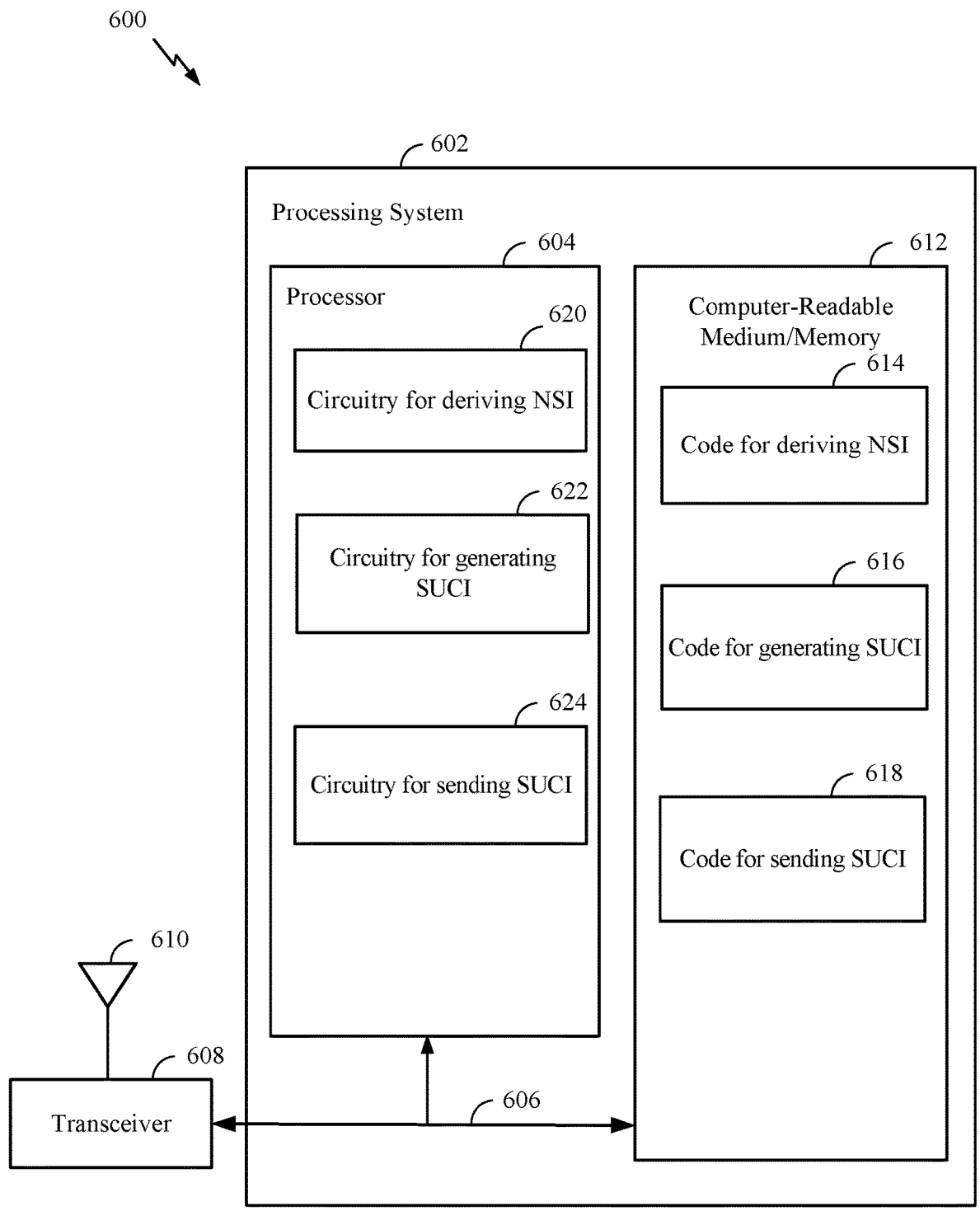
FIG. 6 illustrates a communications device that may include various components configured to perform operations for the techniques disclosed herein.

FIG. 6 illustrates a communications device 600 that may include various components (e.g., corresponding to means-plus-function components) configured to perform operations for the techniques disclosed herein, such as the operations illustrated in FIG. 4. The communications device 600 includes a processing system 602 coupled to a transceiver 608 (e.g., a transmitter and/or a receiver). The transceiver 608 is configured to transmit and receive signals for the communications device 600 via an antenna 610, such as the various signals as described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/memory 612 is configured to store instructions (e.g., computer-executable code) that when executed by the processor 604, cause the processor 604 to perform the operations illustrated in FIG. 4, or other operations for performing the various techniques discussed herein for UE authentication. In certain aspects, computer-readable medium/memory 612 stores code 614 for deriving a NSI in a NAI format, the NSI including a NID stored at the UE; code 616 for generating a SUCI based on the NSI for authentication of the UE with a NPN; and code 618 for sending the SUCI to a network entity for the authentication of the UE with the NPN. In certain aspects, the processor 604 has circuitry configured to implement the code stored in the computer-readable medium/memory 612. The processor 604 includes circuitry 620 deriving a NSI in a NAI format, the NSI including a NID stored at the UE; circuitry 622 for generating a SUCI based on the NSI for authentication of the UE with a NPN; and circuitry 624 for sending the SUCI to a network entity for the authentication of the UE with the NPN.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user-equipment (UE), comprising:
  determining that a universal subscriber identity module (USIM) of the UE comprises an international mobile subscriber identity (IMSI) comprising information that matches a subscription permanent identifier (SUPI) of a non-public network (NPN) or that matches a public land and mobile network identifier (PLMN ID) of an identifier of the NPN stored at the UE;
  deriving a network specific identifier (NSI) in a network access identifier (NAI) format, based on the determination, the NSI including a network identifier (NID);
  generating a subscription concealed identifier (SUCI) based on the NSI; and
  sending the SUCI to a network entity for authentication of the UE with the NPN.

2. The method of claim 1, wherein the information of the IMSI comprises a PLMN ID.

3. The method of claim 1, wherein the NID is stored at a mobile equipment (ME) of the UE.

4. The method of claim 1, wherein the NAI format comprises a username portion and a realm portion, the realm portion comprising the NID.

5. The method of claim 4, wherein the realm portion further comprises the PLMN ID.

6. The method of claim 5, wherein the PLMN ID and the NID are parts of a NPN identifier stored at a mobile equipment (ME) of the UE.

7. The method of claim 4, wherein the username portion comprises a mobile subscription identification number (MSIN) of the UE.

8. The method of claim 7, wherein the SUCI is generated by encrypting the MSIN, the username portion of the NSI comprising the encrypted MSIN.

9. The method of claim 8, wherein:
  if a universal subscriber identity module (USIM) of the UE is configured to perform SUCI calculations, the encryption of the MSIN is performed via the USIM of the UE; and
  if a mobile equipment (ME) of the UE is configured to perform the SUCI calculations, the encryption of the MSIN is performed via the ME of the UE.

10. The method of claim 1, wherein the NPN comprises a standalone NPN (SNPN).

11. The method of claim 1, wherein the NPN comprises a wireless local area network (WLAN).

12. An apparatus for wireless communication by a user-equipment (UE), comprising:
  a memory; and
  one or more processors coupled to the memory, the memory and the one or more processors being configured to:
    determine that a universal subscriber identity module (USIM) of the UE comprises an international mobile subscriber identity (IMSI) comprising information that matches a subscription permanent identifier (SUPI) of a non-public network (NPN) or that matches a public land and mobile network identifier (PLMN ID) of an identifier of the NPN stored at the UE;
    derive a network specific identifier (NSI) in a network access identifier (NAI) format, based on the determination, the NSI including a network identifier (NID);
    generate a subscription concealed identifier (SUCI) based on the NSI; and
    send the SUCI to a network entity for authentication of the UE with the NPN.

13. The apparatus of claim 12, wherein the information of the IMSI comprises a PLMN ID.

14. The apparatus of claim 12, wherein the NID is stored at a mobile equipment (ME) of the UE.

15. The apparatus of claim 12, wherein the NAI format comprises a username portion and a realm portion, the realm portion comprising the NID.

16. The apparatus of claim 15, wherein the realm portion further comprises the PLMN ID.

17. The apparatus of claim 16, wherein the PLMN ID and the NID are parts of a NPN identifier stored at a mobile equipment (ME) of the UE.

18. The apparatus of claim 15, wherein the username portion comprises a mobile subscription identification number (MSIN) of the UE.

19. The apparatus of claim 18, wherein the SUCI is generated by encrypting the MSIN, the username portion of the NSI comprising the encrypted MSIN.

20. The apparatus of claim 19, wherein:
- if a universal subscriber identity module (USIM) of the UE is configured to perform SUCI calculations, the encryption of the MSIN is performed via the USIM of the UE; and
- if a mobile equipment (ME) of the UE is configured to perform the SUCI calculations, the encryption of the MSIN is performed via the ME of the UE.

21. The apparatus of claim 12, wherein the NPN comprises a standalone NPN (SNPN).

22. An apparatus for wireless communication by a user-equipment (UE), comprising:
- means for determining that a universal subscriber identity module (USIM) of the UE comprises an international mobile subscriber identity (IMSI) comprising information that matches a subscription permanent identifier (SUPI) of a non-public network (NPN) or that matches a public land and mobile network identifier (PLMN ID) of an identifier of the NPN stored at the UE;
- means for deriving a network specific identifier (NSI) in a network access identifier (NAI) format, based on the determination, the NSI including a network identifier (MD);
- means for generating a subscription concealed identifier (SUCI) based on the NSI; and
- means for sending the SUCI to a network entity for authentication of the UE with the NPN.

23. The apparatus of claim 22, wherein the information of the IMSI comprises a PLMN ID.

24. A non-transitory computer-readable medium having instructions stored thereon to cause a user-equipment (UE) to:
- determine that a universal subscriber identity module (USIM) of the UE comprises an international mobile subscriber identity (IMSI) comprising information that matches a subscription permanent identifier (SUPI) of a non-public network (NPN) or that matches a public land and mobile network identifier (PLMN ID) of an identifier of the NPN stored at the UE;
- derive a network specific identifier (NSI) in a network access identifier (NAI) format, based on the determination, the NSI including a network identifier (NID);
- generate a subscription concealed identifier (SUCI) based on the NSI; and
- send the SUCI to a network entity for authentication of the UE with the NPN.

25. The non-transitory computer-readable medium of claim 24, wherein the information of the IMSI comprises a PLMN ID.

* * * * *